(12) United States Patent
Shahana et al.

(10) Patent No.: US 7,090,603 B2
(45) Date of Patent: Aug. 15, 2006

(54) REAR DERAILLEUR WITH A SHOCK ABSORBER DISPOSED BETWEEN A BASE MEMBER AND A MOUNTING MEMBER

(75) Inventors: Satoshi Shahana, Osaka (JP); Masayuki Arakawa, Sakai (JP); Nobukatsu Hara, Izumisano (JP)

(73) Assignee: Shimano, Inc., Sakai (JP)

( * ) Notice: Subject to any disclaimer, the term of this patent is extended or adjusted under 35 U.S.C. 154(b) by 223 days.

(21) Appl. No.: 10/605,832

(22) Filed: Oct. 29, 2003

(65) Prior Publication Data

US 2004/0110587 A1    Jun. 10, 2004

(30) Foreign Application Priority Data

Oct. 30, 2002   (JP) .............................. 2002-316150

(51) Int. Cl.
*F16H 59/04*    (2006.01)
(52) U.S. Cl. ....................................................... 474/80
(58) Field of Classification Search .................. 474/79, 474/80, 81, 82, 83, 78
See application file for complete search history.

(56) References Cited

U.S. PATENT DOCUMENTS

| | | | | |
|---|---|---|---|---|
| 5,498,211 | A | * | 3/1996 | Hsu .............................. 474/80 |
| 5,919,106 | A | | 7/1999 | Ichida |
| 5,931,753 | A | * | 8/1999 | Ichida .......................... 474/82 |
| 6,287,228 | B1 | | 9/2001 | Ichida |
| 6,793,598 | B1 | * | 9/2004 | Savard .......................... 474/82 |
| 2003/0083162 | A1 | * | 5/2003 | Tsai et al. ...................... 474/82 |
| 2004/0110586 | A1 | * | 6/2004 | Shahana et al. .............. 474/80 |

* cited by examiner

*Primary Examiner*—Vicky A. Johnson
(74) *Attorney, Agent, or Firm*—James A. Deland (57) ABSTRACT

A bicycle derailleur comprises a mounting member adapted to be mounted to a bicycle frame, a base member pivotably mounted relative to the mounting member, a biasing mechanism that biases the base member clockwise relative to the mounting member when viewed laterally outwardly from the base member, a chain guide and a coupling mechanism coupled between the base member and the chain guide so that the chain guide moves relative to the base member. A rotation restricting mechanism is disposed in a force communicating path between the mounting member and the base member to restrict counterclockwise rotation of the base member relative to the mounting member.

28 Claims, 9 Drawing Sheets

REAR DERAILLEUR WITH A SHOCK ABSORBER DISPOSED BETWEEN A BASE MEMBER AND A MOUNTING MEMBER

BACKGROUND OF INVENTION

The present invention is directed to bicycles and, more particularly, to a bicycle derailleur with rotation restricting structures.

A bicycle rear derailleur engages a driving chain on one of a plurality of sprockets mounted on the rear wheel hub. A conventional derailleur comprises a base member detachably fastened to the back end the frame, a chain guide for guiding the chain onto the plurality of sprockets, a movable member that pivotably supports the chain guide, and a link mechanism that movably supports the movable member relative to the base member. Such a derailleur is shown in Japanese Unexamined Patent Application No. 11-263282, for example.

Rear dropout portions are formed at the back end of the frame for installing the rear wheel hub and the rear derailleur. The base member may be supported on the frame in a cantilevered manner by screwing a bolt into a threaded opening formed in one of the frame dropout portions. The base member usually is mounted by means of a stopper plate to the rear dropout portion in a manner that allows the base member to pivot relative to the frame. The stopper plate may be mounted on the rear dropout portion in a manner that allows the mounting position of the base member to be adjusted and to restrict the base member from rotating counterclockwise when viewed laterally outwardly from the base member. A coil spring may be disposed between the stopper plate and the base member to bias the base member clockwise and provide tension to the chain.

The chain guide has a pair of vertically aligned pulleys that guide the chain onto one of the plurality of sprockets, wherein the chain guide is pivotably coupled to the moveable member so that the chain guide pivots around an axis that is substantially parallel to the hub axle. The chain guide is biased relative to the movable member in a direction that also produces tension on the chain (typically clockwise when viewed laterally outwardly from the derailleur). The link mechanism may comprise a four-point link mechanism having a pair of links that move the movable member in the direction of the hub axle and diametrically outwardly as the chain guide moves closer to the sprockets. The inner cable of a Bowden cable assembly is fastened to the link mechanism such that pulling or releasing the inner cable using a shifter disposed on the handlebar causes the link mechanism to move the movable member and chain guide to engage the chain with a desired sprocket.

In conventional rear derailleurs, shocks to the bicycle as it runs along rough paths that are extremely uneven, such as those found in mountainous terrain, can sometimes force the base member to pivot counterclockwise against the biasing force of the coil spring. When the base member is thus forced to pivot counterclockwise, the movable member or the chain guide may strike the chain stay of the bicycle frame, thus risking damage to the chain stay, the chain guide or the movable member.

SUMMARY OF INVENTION

The present invention is directed to various features of a bicycle derailleur. In one embodiment, a bicycle derailleur comprises a mounting member adapted to be mounted to a bicycle frame, a base member pivotably mounted relative to the mounting member, a biasing mechanism that biases the base member clockwise relative to the mounting member when viewed laterally outwardly from the base member, a chain guide and a coupling mechanism coupled between the base member and the chain guide so that the chain guide moves relative to the base member. A rotation restricting mechanism is disposed in a force communicating path between the mounting member and the base member to restrict counterclockwise rotation of the base member relative to the mounting member. Additional inventive features will become apparent from the description below, and such features alone or in combination with the above features may form the basis of further inventions as recited in the claims and their equivalents.

DETAILED DESCRIPTION

Figure 1:
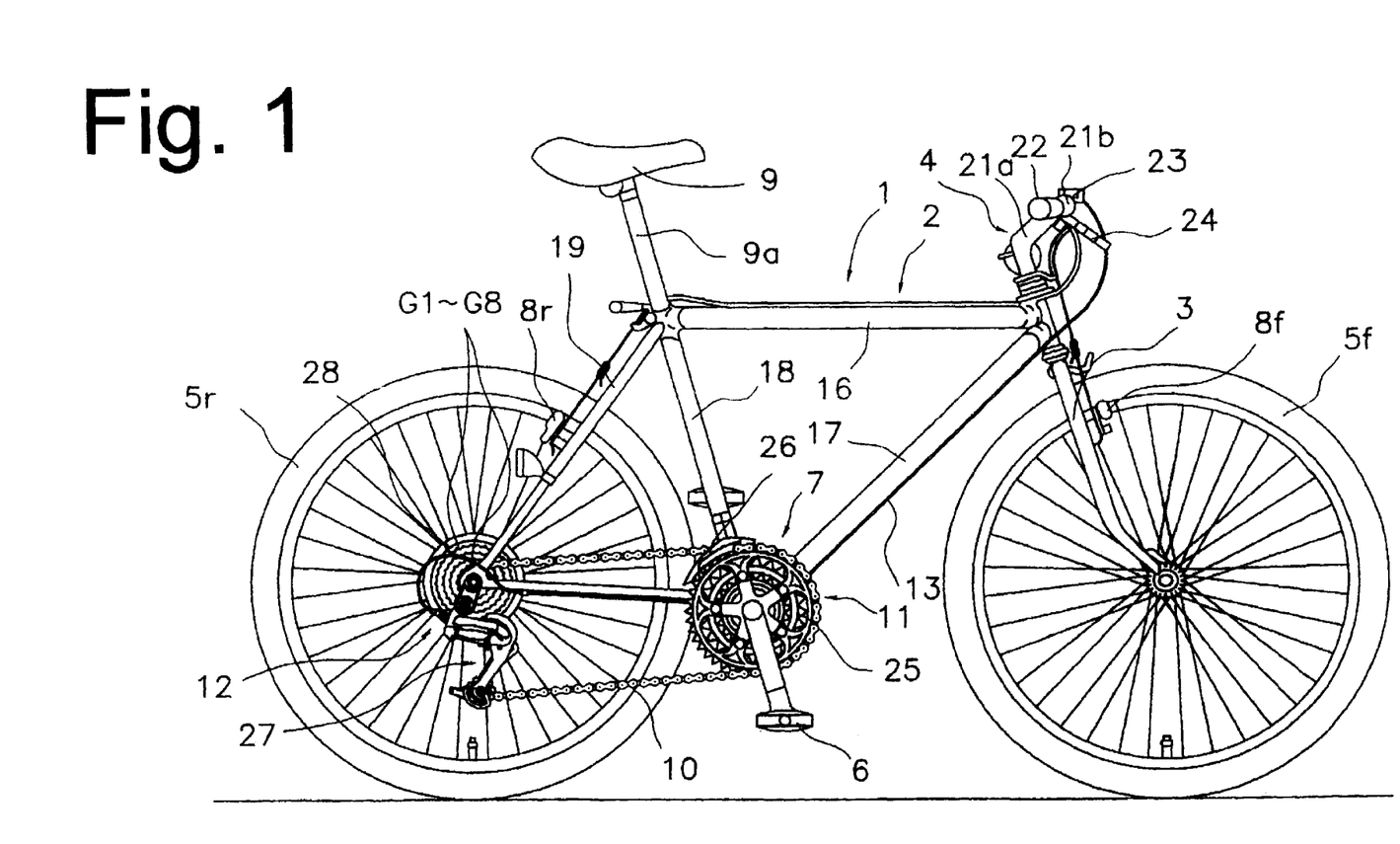
FIG. 1 is a side view of a particular embodiment of a bicycle.

FIG. 1 is a side view of a particular embodiment of a bicycle 1. Bicycle 1 includes a diamond-shaped frame body 2, a front fork 3, a handlebar unit 4, a front wheel 5f, a rear wheel 5r, a drive unit 7 for transferring rotation of pedals 6 to rear wheel 5r, a front brake unit 8f and a rear brake unit 8r.

Frame body 2 comprises front and rear triangular portions, wherein front triangular portion comprises a head tube 15, a top tube 16, a down tube 17, and a seat tube 18. Fork 3 is mounted to head tube 15 for rotation around an inclined axis. Handlebar unit 4 is mounted to the upper portion of fork 3, and front wheel 5f is rotatably mounted to the lower portion of fork 3. Handlebar unit 4 comprises a handle stem 21a and a handlebar 21b mounted to the top of handlebar stem 21a, wherein handle stem 21a is mounted to the top of front fork 3. Handlebar 21b is equipped with a pair of left and right grips 22, a pair of left and right shift control units 23, and a pair of left and right brake controllers 24. A vertically adjustable seat post 9a with a saddle 9 mounted thereon is mounted in the upper portion of seat tube 18, and a forward portion of drive unit 7 is rotatably mounted at the lower portion of seat tube 18.

Figure 3:
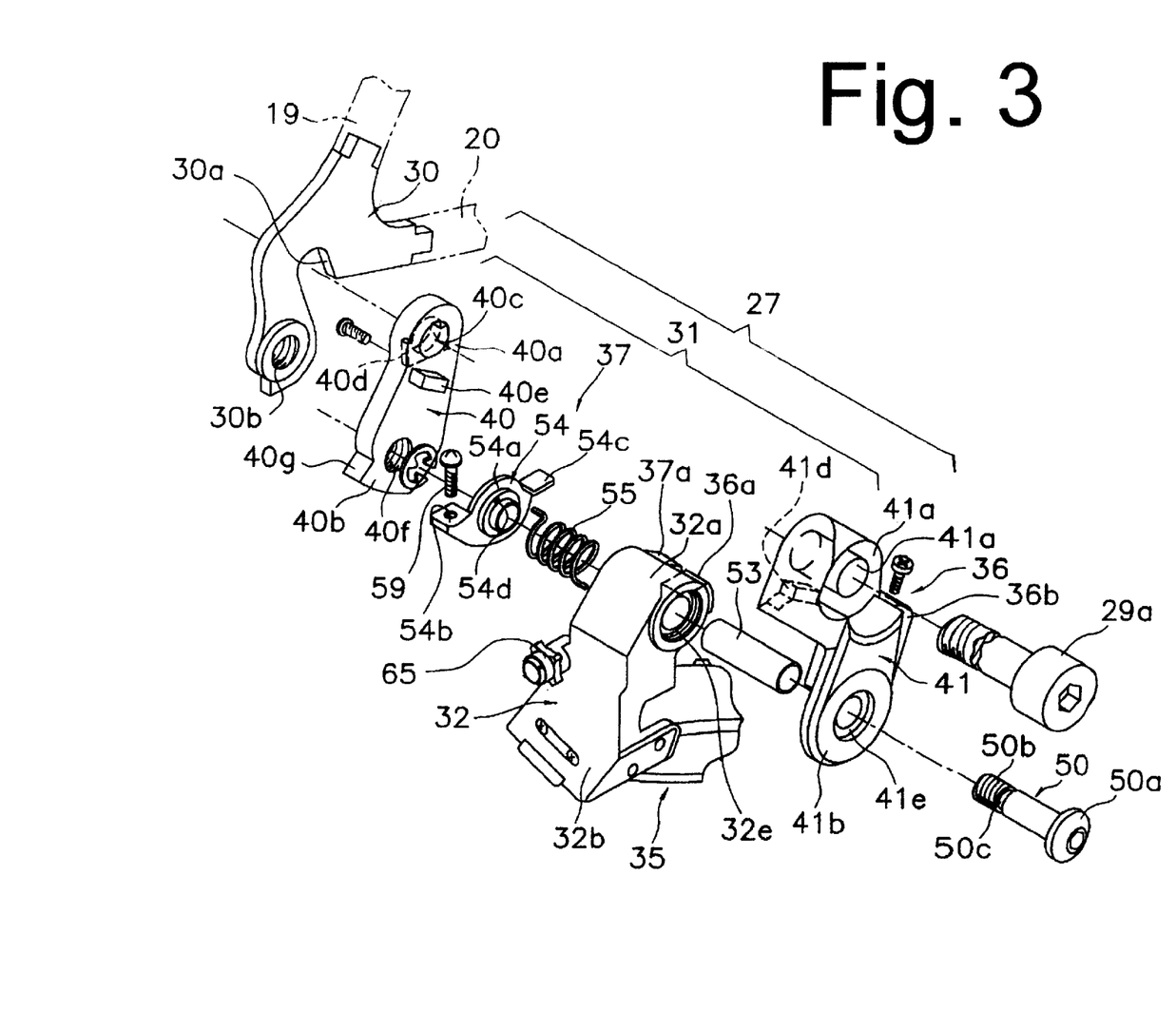
FIG. 3 is an exploded view of relevant components of the rear derailleur near the base member of the derailleur.
Figure 4:
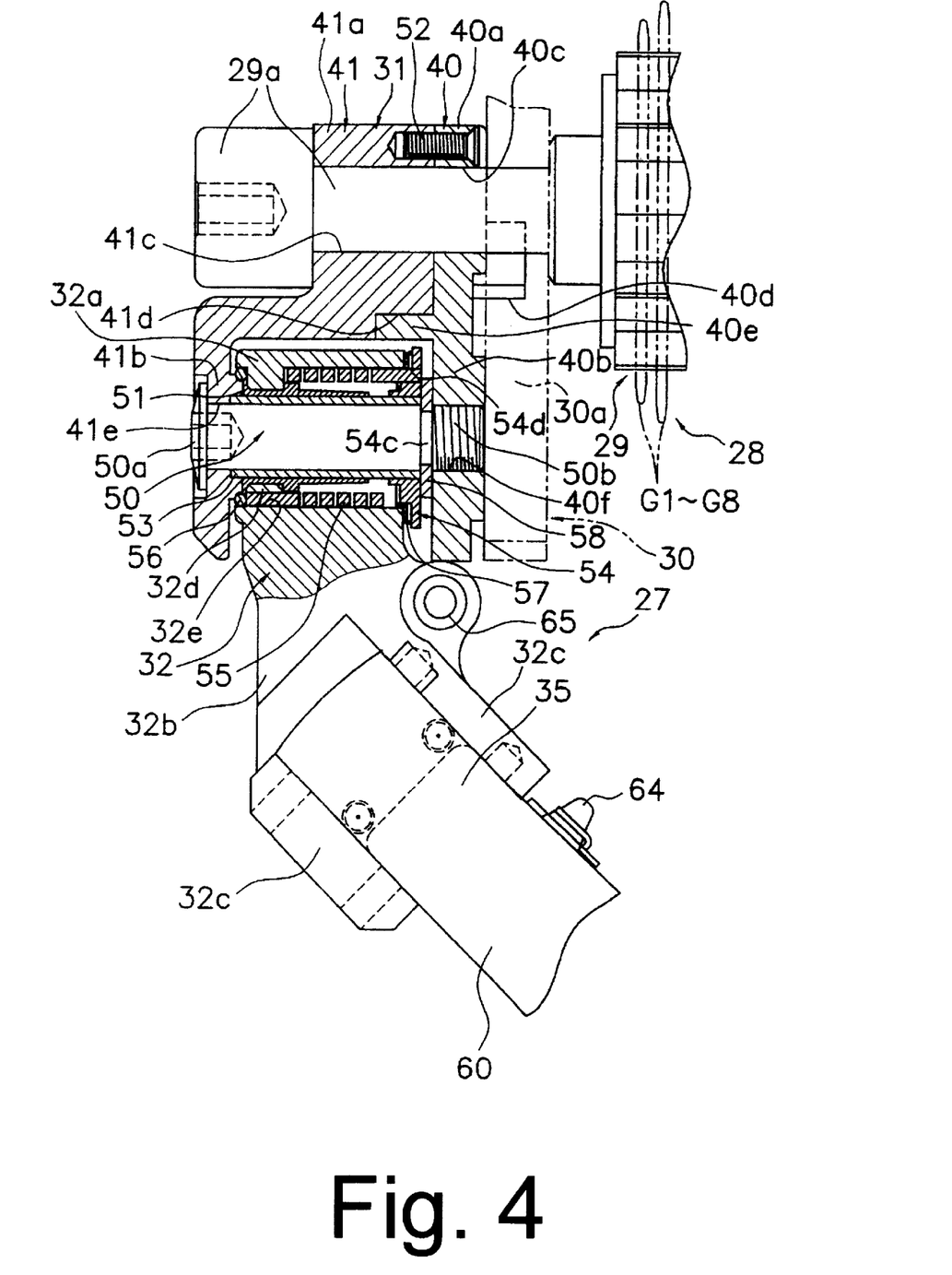
FIG. 4 is a partial cross sectional view of the components near the base member of the rear derailleur in an assembled condition.

The rear triangular portion of frame body 2 comprises seat tube 18, a pair of seatstays 19 and a pair of chainstays 20. The back ends of seatstays 19 and chainstays 20 are connected by rear dropout portions 30 (FIG. 3), and rear wheel 5r is mounted to these rear dropout portions 30. As shown in FIGS. 3 and 4, the right side rear dropout portion 30 includes a mounting slot 30a and a screw hole 30b. Mounting slot 30a typically is formed sloping diagonally upward from the bottom of rear dropout portion 30, and screw hole 30b typically is formed at the end of a projecting portion that projects diagonally downward from the back of rear dropout portion 30. Mounting slot 30a is used for installing the hub axle 29a of a rear hub 29 of rear wheel 5r, and screw hole 30b is used for mounting a derailleur 27. In order to prevent damage or deformation to other components of frame body 2, rear dropout portions 30 may be less rigid than other components and may be designed to be replaceable if damaged.

Drive portion 7 has a chain 10 and front and rear external gearshift devices 11 and 12. Front external gearshift device 11 is disposed at a bottom bracket portion of seat tube 18, and it includes a gear crank 25 and a front derailleur 26. Gear crank 25 may have a plurality of (e.g., three) sprockets with different numbers of teeth. Front derailleur 26 is operatively coupled to one of the shift control devices 23 through a shift cable assembly in the form of a Bowden cable (not shown), and front derailleur 26 engages the chain 10 with one of the three sprockets disposed on gear crank 5 in response to the operation of that shift control device 23.

Figure 2:
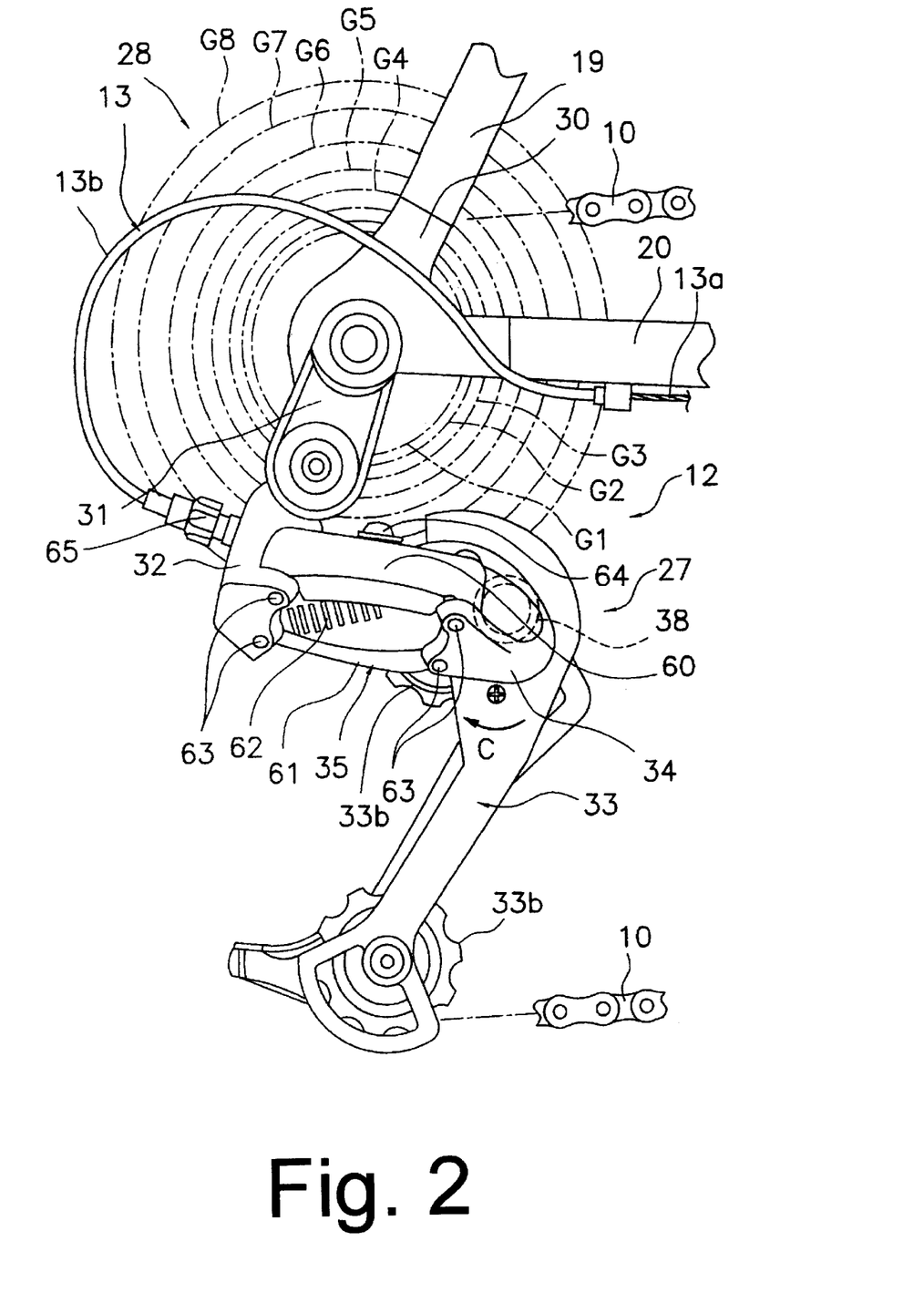
FIG. 2 is a more detailed side view of the rear derailleur.

As shown in FIGS. 1, 2 and 4, rear external gearshift device 12 has rear derailleur 27 and a gear cluster 28 comprising a plurality of (e.g., eight) sprockets G1–G8 with different numbers of teeth mounted on the rear hub 29. Rear derailleur 27 is operatively coupled to one of the shift control devices 23 through a shift cable assembly 13 in the form of a Bowden cable, and rear derailleur 27 engages the chain 10 with one of the sprockets G1–G8 in response to the operation of that shift control device 23.

As shown in FIGS. 2–6, rear derailleur 27 is detachably installed onto the right side rear dropout portion 30. The assembly comprises a mounting member in the form of a bracket 31 fastened to the rear dropout portion 30, a base member 32 rotatably mounted on bracket 31, a chain guide 33, a movable member 34, a coupling mechanism in the form of a link mechanism 35, and first and second rotation restricting mechanisms 36 and 37 for restricting the rotational movement of base member 32 in both rotational directions.

Bracket 31 is detachably fastened by means of a hub axle 29a of rear wheel 5r disposed in the mounting slot 30a of rear dropout portion 30. Bracket 31 comprises a first bracket body 40 and a second bracket body 41, wherein second bracket body 41 is attached to first bracket body 40 by means of a screw 52. Brackets bodies 40 and 41 have first and second upper mounting portions 40a and 41a and first and second lower mounting portions 40b and 41b. First and second upper mounting portions 40a and 41a contact each other and are arranged to be disposed at mounting slot 30a, whereas first and second lower mounting portions 40b and 41b are spaced apart from each other for receiving base member 32 therebetween.

As shown in FIGS. 3 and 4, first bracket body 40 is a plate shaped member. Upper mounting portion 40a has a through-hole 40c for receiving hub axle 29a therethrough, a turnstop projection 40d formed on the surface facing dropout portion 30 for engaging mounting slot 30a, and a positioning projection 40d formed on the opposite surface for engaging second bracket body 41. Turnstop projection 40d is formed at the perimeter of through-hole 40c, and it has a width slightly smaller than the width of mounting slot 30a. Turnstop projection 40d prevents bracket 31 from turning when bracket 31 is mounted to rear dropout portion 30 through hub axle 29a. Positioning projection 40e is used to set the position of bracket bodies 40 and 41 relative to each other.

Second bracket body 41 has a stepped cross-sectional configuration such that second lower mounting portion 41b is laterally offset from second upper mounting portion 41a to form with the first lower mounting portion 40b of first bracket body 40 the space to receive base member 32 therein. Second upper mounting portion 41a includes a through-hole 41c and a positioning recess 41d facing the first upper mounting portion 40a of first bracket body. Through-hole 41c receives hub axle 29a therethrough, and positioning recess 41d mates with positioning projection 40e formed on the first upper mounting portion of first bracket body 40.

First lower mounting portion 40b of first bracket body 40 includes a screw hole 40f, and second lower mounting portion 41b includes a stepped through-hole 41e. A mounting shaft 50 having a head 50a with a hexagonal opening, a threaded portion 50b and a clip groove 50c for mounting an E-clip 58 passes through through-hole 41e and screws into screw hole 40f. Mounting shaft 50 fastens bracket bodies 40 and 41 together and rotatably supports base member 32 in a manner described below. A flat restricting face 40g is formed on the outer peripheral surface of the first lower mounting portion 40b of first bracket body 40 to determine the rotational position of base member 32 relative to bracket 31.

Base member 32 has a tubular boss portion 32a rotatably supported on mounting shaft 50; an arm portion 32b extending radially outwardly from boss portion 32; a first rotation restricting projection 36a, which forms part of a first rotation restricting component of first rotation restricting mechanism 36; and a second rotation restricting projection 37a, which forms a second rotation restricting component of a second rotation restricting mechanism 37. First rotation restricting mechanism 36 restricts rotational movement of base member 32 in the counterclockwise direction (direction of arrow B in FIG. 5), while second rotation restricting mechanism 37 restricts rotational movement of base member 32 in the clockwise direction (direction of arrow A in FIG. 5). A pair of link support portions 32c are formed at the distal end of arm portion 32b for installing link mechanism 35. An annular projection 32d is formed at a laterally outer location on the inner peripheral surface of boss portion 32a for swage-mounting a generally tubular bearing bushing 51. A tubular reinforcing member 53 is disposed between mounting shaft 50 and bearing bushing 51 for reinforcing bracket 31. Reinforcing member 53 has a first end abutting a laterally inner location of second lower mounting portion 41b and a second end abutting the E-clip 58 mounted in the clip groove 50c formed in mounting shaft 50. As a result, even if the outside face of second lower mounting portion 41b should bump into a rock or tree, thereby subjecting the second mounting portion 41b to an outside force, that force will be received by reinforcing member 53, this making the second lower mounting portion 41b resistant to deformation. Reinforcing member 53 also isolates base member 32 from such forces, so it is possible also to reduce the likelihood of deformation of or damage to the base member 32.

A stopper plate 54 is disposed between E clip 58 and a laterally inner location of boss portion 32a. Stopper plate 54 may be fabricated by press molding sheet metal, and it comprises a disk portion 54a and first and second projections 54b. Disk portion 54a has a stepped cross-sectional shape, and first and second projections 54b and 54c extend diametrically outward from disk portion 54a and bend in mutually opposite lateral directions. Reinforcing member 53 extends through a central opening formed in disk portion 54a. First projection 54b is formed such that it can be juxtaposed with the restricting face 40g formed on the first bracket body 40, and an adjusting screw 59 is screwed into this first projection 54b with the distal end of adjusting screw 59 contacting restricting face 40g. The rotational position of stopper plate 54, and hence base member 32, relative to bracket 31 may be adjusted by turning adjusting screw 59. Second projection 54c is formed such that it can be juxtaposed (e.g., abut) with second rotation restricting projection 37a formed on base member 32.

A biasing mechanism in the form of a torsion coil spring 55 is mounted within boss portion 32a of base member 32 such that a first end of spring 55 is detained in a spring detent hole 32e formed in projection 32d and the other end of spring 55 is detained in a spring detent hole 54d formed in stopper plate 54. Spring 55 biases stopper plate 54 counterclockwise so that second projection 54c of stopper plate 54 abuts against second rotation restricting projection 37a. An O-ring 56 is mounted between the projection 32d of boss portion 32a and the second lower mounting portion 41b of second bracket body 41 for preventing liquids or foreign matter from penetrating into the cavity containing spring 55. A disk-shaped seal ring 57 is mounted between boss portion 32a and stopper plate 54 for the same purpose.

Figure 5:
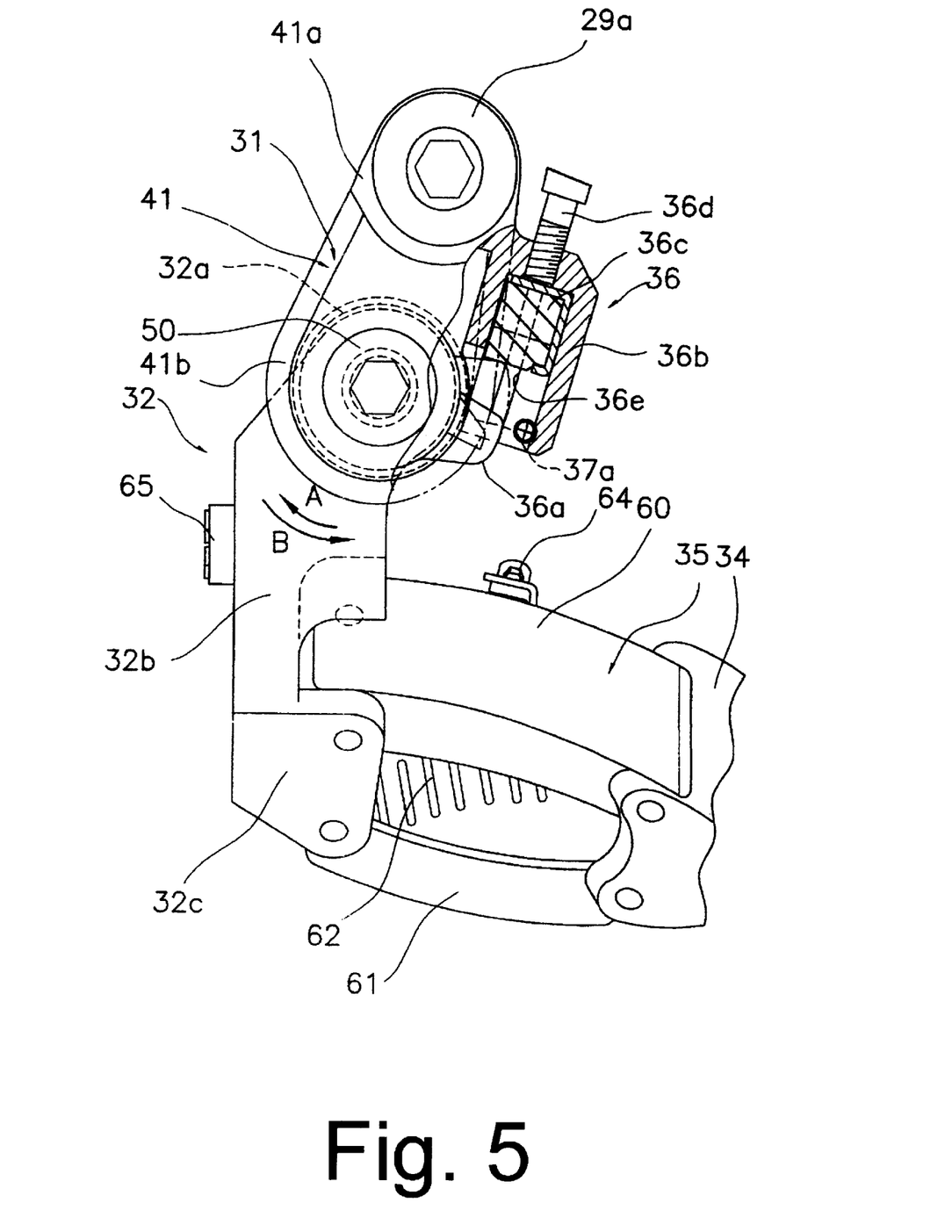
FIG. 5 is a partial cross sectional view of a rotation restricting mechanism for the rear derailleur.
Figure 6:
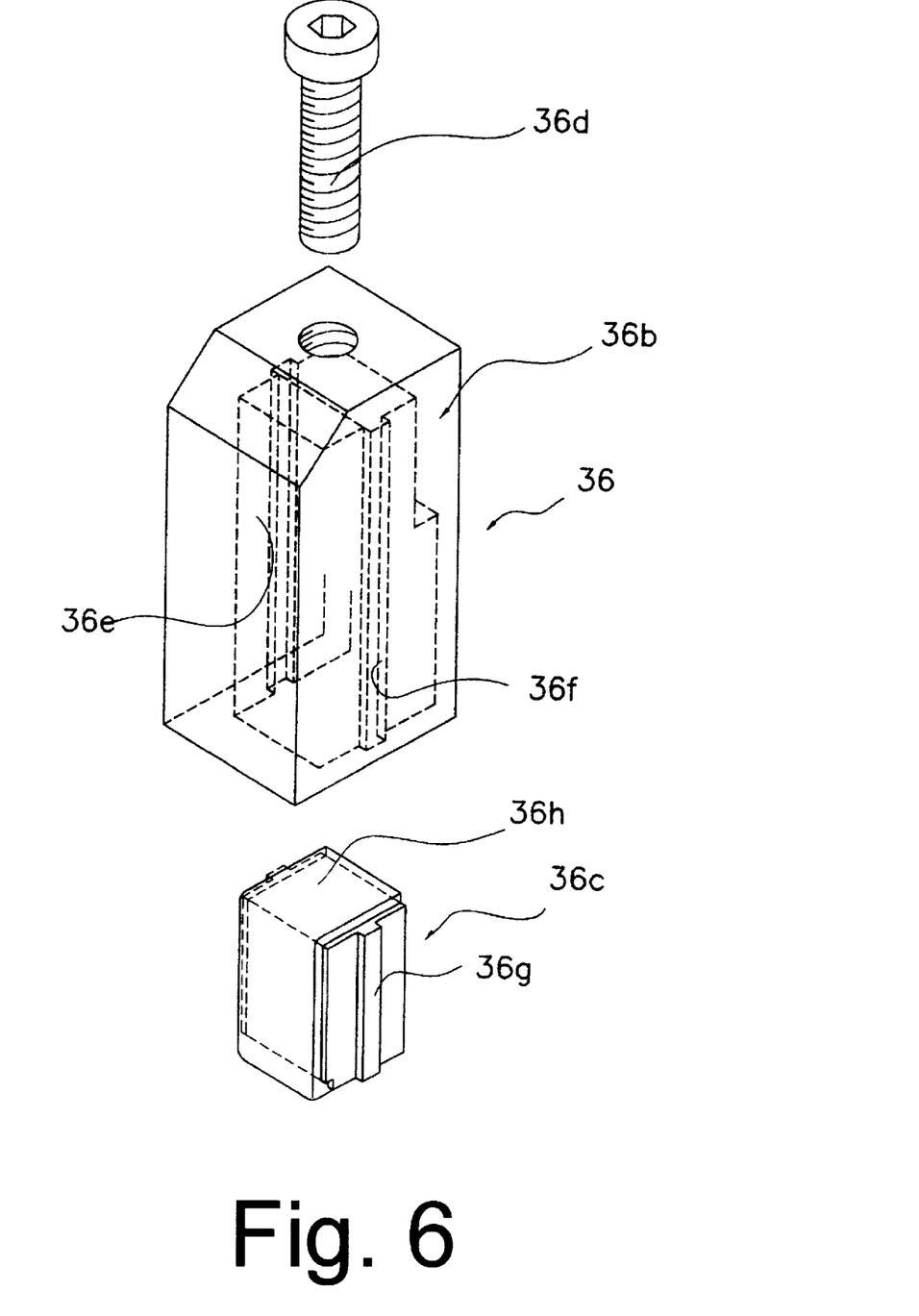
FIG. 6 is an exploded view of shock absorbing components for the rotation restricting mechanism.

As shown in FIGS. 3, 5 and 6, first rotation restricting mechanism 36 comprises the first restricting projection 36a on base member 32, a guide portion 36b integrally formed with second bracket body 41, a resilient shock absorber 36c which forms another second rotation restricting component disposed in guide portion 36b, and an adjusting bolt 36d provided for adjusting the position of shock absorber 36c. Shock absorber 36c may be formed from a resilient material such as synthetic rubber, for example. Guide portion 36b has a generally rectangular shape and forms an internal rectangular guide space 36e with a guide grooves 36f on a pair of opposite walls. Shock absorber 36c has a pair of guide projections 36g on opposite walls for mating with guide grooves 36f. Cushion member 36c is retained within guide space 36e by a generally C-shaped metal retaining member 36h.

To use first rotation restricting mechanism 36, the adjusting bolt 36d is turned at a time when chain guide 33 and movable member 34 are not in contact with the chainstays 20 until first restricting projection 36a abuts cushion member 36c. As a result, first rotation restricting mechanism 36 restricts the rotational movement of base member 32 so that the chain guide 33 and moving member 34 do not contact the chainstays 20, even if base member 32 rotates counterclockwise.

Second rotation restricting mechanism 37 restricts rotational movement of base member 32 in the clockwise direction. Second rotation restricting mechanism 37 comprises the second restricting projection 37a on base member 32 and the second projection 54c on stopper plate 54. In the absence of tension on chain 10, stopper plate 54 turns counterclockwise under the biasing force of tension coil spring 55 until second restricting projection 37a abuts against second projection 54c, thus setting the rotational position of base member 32 relative to stopper plate 54.

Chain guide 33 includes a pair of pulleys 33a and 33b, wherein chain 10 wraps around the front portion of pulley 33a and around the rear portion of pulley 33b. Chain guide 33 guides chain 10 onto selected ones of the plurality of sprockets C1–G8. Chain guide 33 is coupled to movable member 34 for pivoting around an axis substantially parallel to the hub axle 29a of rear hub 29. A coil spring 38 is installed between chain guide 33 and movable member 34 for biasing chain guide 33 clockwise (the direction of arrow C in FIG. 2) when viewed from the laterally outside. Such biasing, in conjunction with the clockwise bias of base member 32, imparts tension to the chain 10 so that chain 10 resists coming off of the gear cluster 28. Also, since base member 32 and chain guide 33 pivot during gearshift operations, the path of motion of chain guide 33 readily conforms to the radial profile of sprockets C1–G8 so that chain 10 may be guided smoothly onto any of the sprockets C1–G8.

Link mechanism 35 couples movable member 34 to base member 32 so that movable member 34 can move relative to base member 32. As shown in FIG. 2, link mechanism 35 comprises first and second link members 60 and 61 mounted at their first ends through a pair of pivot shafts 63 to a link support 32c disposed at the lower portion of base member 32. The second ends of first and second link members 60 and 61 are mounted to movable member 34 through another pair of pivot shafts 63. A coil spring 62 is connected to a pair of the pivot shafts 63 situated at opposite corners so that first and second link members 60 and 61 bias movable member 34 and chain guide 33 towards the large diameter sprocket G8. An inner wire mounting unit 64 is disposed at a side face of second link member 61 for fastening the inner wire 13a of shift cable assembly 13, and an outer casing mounting unit 65 is disposed on base member 32 in close proximity to boss portion 32a for fastening the outer casing 13b of shift cable assembly 13.

When riding the bicycle, the rear derailleur 27 may be operated by operating the corresponding shift control unit 23 to select an appropriate gear ratio in response to a change in riding conditions. Operating the shift control unit 23 causes the inner wire 13a to be pulled and released relative to the outer casing 13b, and the movement of inner wire 13a is transmitted to the first link member 60 via the inner wire mounting unit 64. The combination of the biasing force of spring 62 and the pulling and releasing force of inner wire 13a cause the first and second link members 60 and 61 to pivot around pivot shafts 63, chain guide 33 and base member 62 rotate to appropriate positions in accordance with the biasing force of springs 38 and 55, chain guide moves in the direction of the hub axle 29a, and chain 10 is guided by pulleys 33a and 33b onto the desired sprocket.

It is possible that the bracket 31 or base member 32 may bump into a rock, tree, or the like during riding. However, since the base member 32 of derailleur 27 in this embodiment is supported at two lateral sides by bracket 31, bracket 31 and base member 32 are very rigid and resist damage and deformation. Additionally, since the bracket 31 is also fastened to hub axle 29, which is more rigid than the distal ends of rear dropout portions 30, rear dropout portions 30 also are more resistant to damage and deformation. At the same time, the first rotation restricting mechanism 36 restricts counterclockwise rotation of base member 32, thus making it difficult for chain guide 33 to come into contact with the chainstays 20. Thus, damage and deformation of rear derailleur 27 can be avoided when traveling over rough terrain such as mountainous areas or other areas with dips and rises or obstacles.

Figure 7:
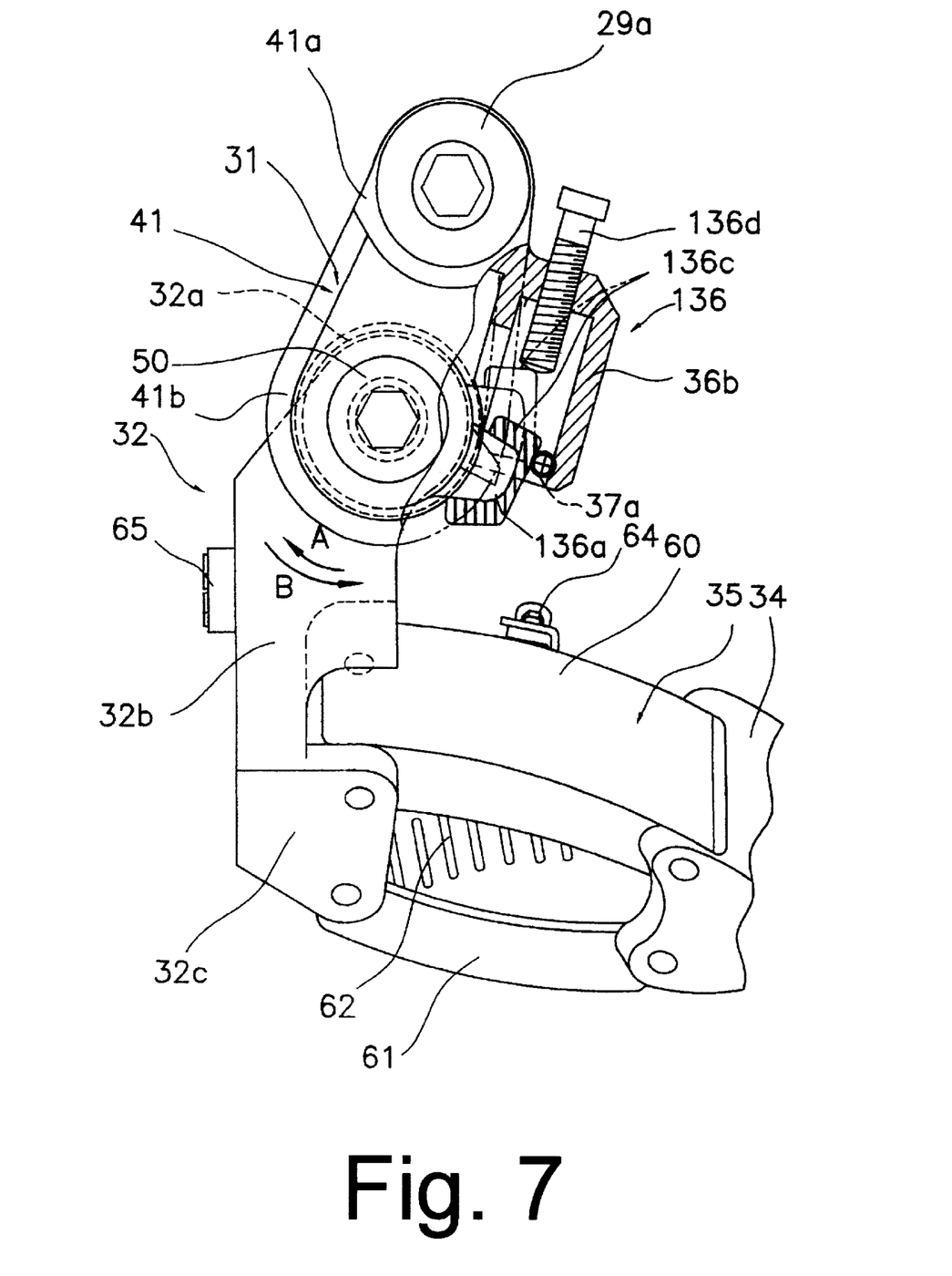
FIG. 7 is a partial cross sectional view of an alternative embodiment of a rotation restricting mechanism for the rear derailleur.

In the above embodiment, the cushion member 36c was provided on the bracket 31. However, as shown in FIG. 7, a cushion member 136c may be provided on a first rotation restricting protrusion 136a, and an adjusting bolt 136d may contact cushion member 136c upon relative rotation between bracket 31 and base member 32.

Figure 8:
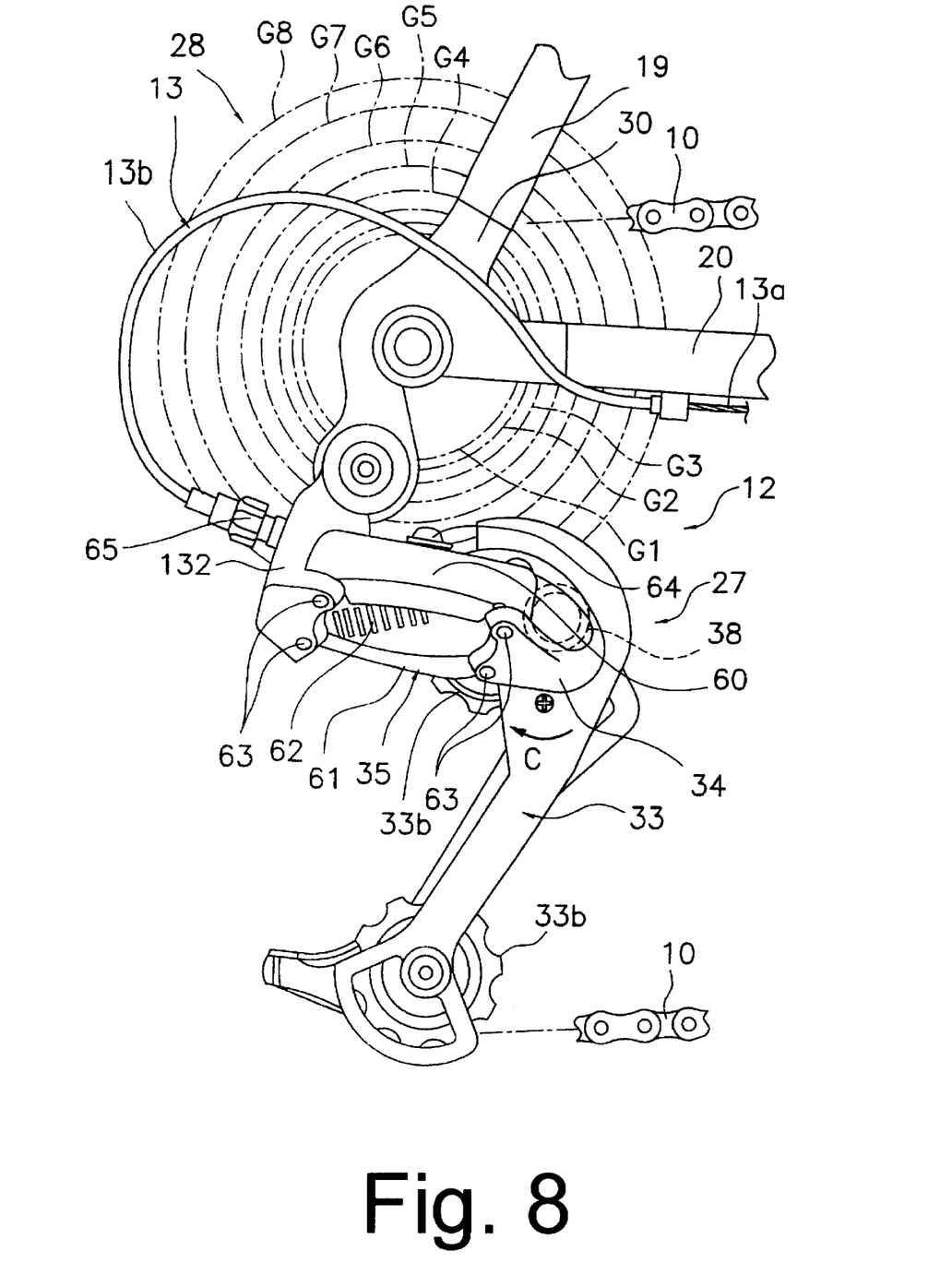
FIG. 8 is a more detailed view of another alternative embodiment of a rear derailleur.
Figure 9:
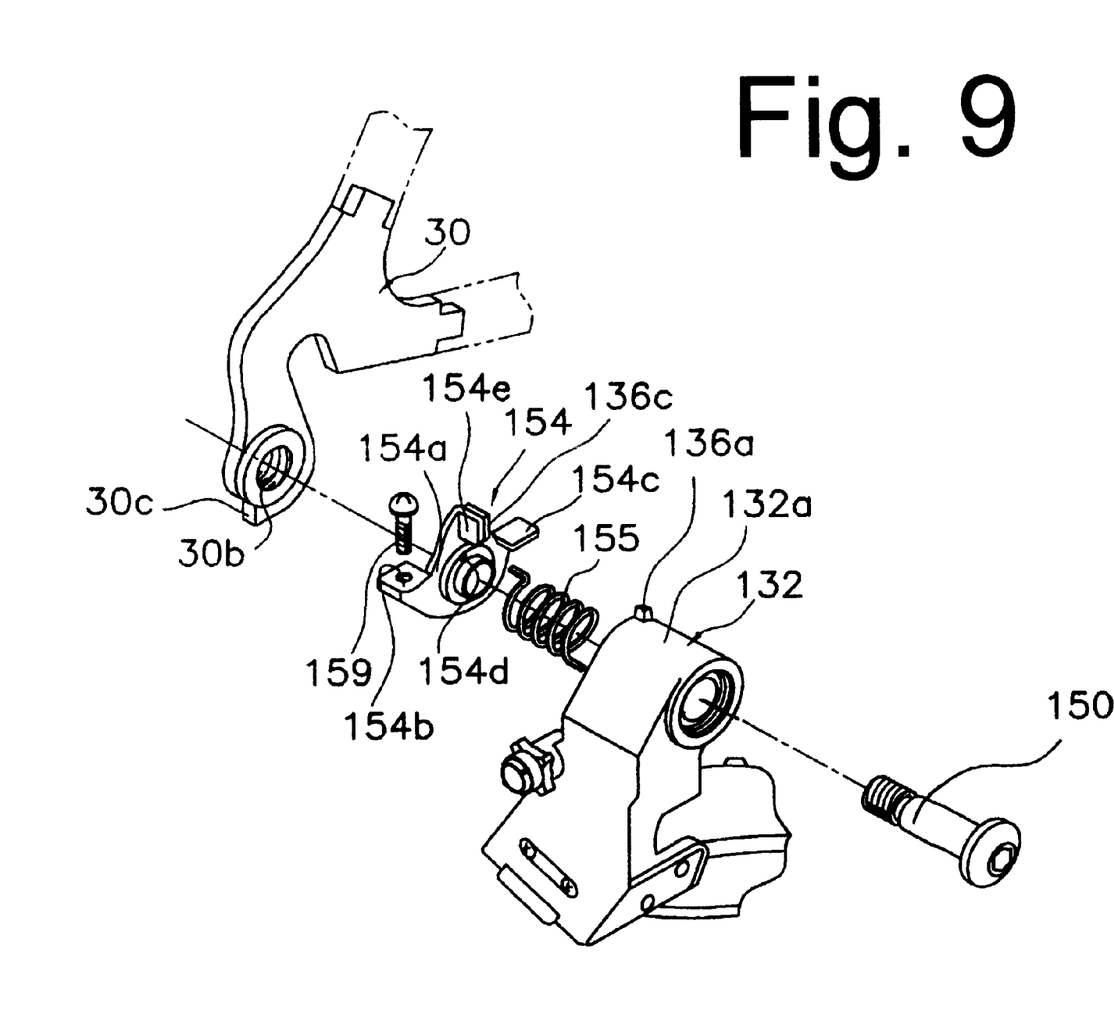
FIG. 9 is an exploded view of relevant components of another alternative embodiment of a rear derailleur near the base member of the derailleur.

Bracket 31 was used as a mounting member in the above embodiments. However, as shown in FIGS. 8 and 9, a stopper plate 154 may be used as the mounting member. In that embodiment, a first end of a coil spring 155 is retained in an opening 154d in stopper plate 154, and the second end of coil spring 155 is retained in a boss portion 132a of a base member 132. As a result, base member 132 is pivotably mounted relative to stopper plate 154 and is biased in the clockwise direction. Base member 132 and stopper plate 154 are mounted on the rear dropout portion 30 by means of a mounting shaft 150 screwed into the threaded hole 30b of rear dropout portion 30. A rotation restricting projection 136a, which forms a first rotation restricting component, projects radially outwardly from boss 132a of base member 132.

Stopper plate 154 may be constructed by press forming a metal plate. Stopper plate 154 comprises a disc 154a with a stepped cross section. First, second, and third protrusions 154b, 154c, and 154e extend radially outward from disc 154a, wherein protrusion 154b is bent laterally inwardly, and protrusions 154c and 154e are bend laterally outwardly. The first protrusion 154b is adapted to engage the rear dropout portion 30 to set a rotational position of stopper plate 154 relative to the bicycle frame. An adjusting screw 159 is disposed in first protrusion 154b and contacts an abutment 30c on rear dropout portion 30 to adjust the mounting angle of stopper plate 154. The second protrusion 154c limits clockwise rotation of base member 132 in the same manner as the first embodiment. The third protrusion 154e, which forms a part of a second rotation restricting component, cooperates with rotation restricting projection 136a on base member 132 to limits counterclockwise rotation of base member 132. A shock absorber 136c made of an elastic material such as synthetic rubber, which form another part of a second rotation restricting component, is fixed by a suitable fixing means (e.g., as adhesion) to third protrusion 154e. Of course, a shock absorber could be disposed on rotation restricting protrusion 136a instead of or in addition to third protrusion 154e. In any event, the rotation restricting mechanism in this embodiment also limits the counterclockwise rotation of base member 132, thereby preventing chain guide 33 or movable member 34 from striking the chain stay.

While the above is a description of various embodiments of inventive features, even further modifications may be employed without departing from the spirit and scope of the present invention. For example, the cushion member 36c of first swivel restricting mechanism 36 of the first described embodiment may be adjusted using adjusting bolt 36d to adjust the rotational position restriction of the chain guide 33 and movable member 34, but adjusting bolt 36d may be omitted so that the rotational position restriction is fixed.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

The invention claimed is:

1. A bicycle derailleur adapted to be mounted to a bicycle frame, wherein the derailleur comprises:
    a mounting member adapted to be mounted to the bicycle frame;
    a base member pivotably mounted relative to the mounting member;
    a biasing mechanism that biases the base member clockwise relative to the mounting member when viewed laterally outwardly from the base member;
    a chain guide;
    a coupling mechanism coupled between the base member and the chain guide so that the chain guide moves relative to the base member; and
    a rotation restricting mechanism disposed in a force communicating path between the mounting member and the base member to restrict counterclockwise rotation of the base member relative to the mounting member;
    wherein the rotation restricting mechanism is positioned to substantially limit the amount of rotation of the base member relative to the mounting member so as to prevent the chain guide from striking the bicycle frame upon counterclockwise rotation of the base member relative to the mounting member when the base member is mounted to the bicycle frame.

2. The derailleur according to claim 1 wherein the mounting member is structured to be mounted to a rear wheel hub axle.

3. The derailleur according to claim 1 wherein the mounting member is structured to be mounted to a bicycle frame member that is spaced apart from a rear wheel hub axle.

4. The derailleur according to claim 1 wherein the rotation restricting mechanism comprises a resilient shock absorber.

5. The derailleur according to claim 1 wherein the rotation restricting mechanism comprises:
    a first rotation restricting component; and
    a second rotation restricting component;
    wherein the first rotation restricting component engages the second rotation restricting component to restrict counterclockwise rotation of the base member relative to the mounting member.

6. The derailleur according to claim 5 wherein one of the first rotation restricting component and the second rotation restricting component is disposed on the mounting member.

7. The derailleur according to claim 5 wherein at least one of the first rotation restricting component and the second rotation restricting component comprises a resilient shock absorber.

8. The derailleur according to claim 7 wherein the shock absorber comprises an elastic member.

9. The derailleur according to claim 5 wherein the first rotation restricting component is disposed on the base member, wherein the mounting member comprises a stopper plate comprising:
    a first protrusion adapted to engage the bicycle frame to set a rotational position of the stopper plate relative to the bicycle frame; and
    a second protrusion adapted to engage a first protrusion on the base member to set a rotational position of the stopper plate relative to the base member; and
    wherein the second rotation restricting component is disposed on the stopper plate.

10. The derailleur according to claim 9 wherein the first rotation restricting component comprises a second protrusion disposed on the base member, and wherein the second rotation restricting component comprises a third protrusion disposed on the stopper plate that engages the second protrusion on the base member.

11. The derailleur according to claim 10 wherein the second rotation restricting component further comprises a shock absorber disposed between the third protrusion on the stopper plate and the second protrusion on the base member.

12. The derailleur according to claim 11 wherein the shock absorber comprises an elastic member.

13. The derailleur according to claim 5 wherein at least one of the first rotation restricting component and the second rotation restricting component comprises an adjusting member that can be advanced and retracted relative to the other one of the first rotation restricting component and the second rotation restricting component.

14. The derailleur according to claim 13 wherein the one of the first rotation restricting component and the second rotation restricting component comprises a threaded member.

15. The derailleur according to claim 13 wherein the first rotation restricting component is disposed on the base member, and wherein the second rotation restricting component comprises an adjusting member that can be advanced and retracted relative to the first rotation restricting component.

16. The derailleur according to claim 15 wherein the first rotation restricting component comprises a first protrusion disposed on the base member.

17. The derailleur according to claim 16 wherein the second rotation restricting component comprises a threaded member.

18. The derailleur according to claim 16 wherein the second rotation restricting component is disposed on the mounting member.

19. The derailleur according to claim 18 wherein the second rotation restricting component further comprises a resilient shock absorber.

20. The derailleur according to claim 19 wherein the second rotation restricting component further comprises a guide that forms an interior space, and wherein the adjusting member is disposed in the interior space.

21. The derailleur according to claim 20 wherein the shock absorber is disposed in the interior space.

22. The derailleur according to claim 21 wherein the shock absorber comprises an elastic member.

23. The derailleur according to claim 18 wherein the first rotation restricting component further comprises a resilient shock absorber.

24. The derailleur according to claim 23 wherein the second rotation restricting component further comprises a guide that forms an interior space, and wherein the adjusting member is disposed in the interior space.

25. The derailleur according to claim 24 wherein the shock absorber is disposed on the first protrusion.

26. The derailleur according to claim 25 wherein the shock absorber comprises an elastic member.

27. The derailleur according to claim 1 wherein the rotation restricting mechanism restricts counterclockwise rotation of the base member relative to the mounting member to substantially less than 360°.

28. The derailleur according to claim 1 wherein the rotation restricting mechanism restricts counterclockwise rotation of the base member relative to the mounting member to less than 180°.

* * * * *